United States Patent
Fleischman

[11] 3,926,504
[45] Dec. 16, 1975

[54] PHOTOGRAPHIC OBJECTIVE
[75] Inventor: Andor A. Fleischman, Northbrook, Ill.
[73] Assignee: Bell & Howell Company, Chicago, Ill.
[22] Filed: June 21, 1974
[21] Appl. No.: 481,946

[52] U.S. Cl. ............... 350/189; 350/176; 350/210; 350/216; 350/255
[51] Int. Cl.² ...................... G02B 3/04; G02B 9/60
[58] Field of Search ........... 350/189, 210, 176, 255, 350/216

[56] References Cited
UNITED STATES PATENTS

| | | |
|---|---|---|
| 2,025,731 | 12/1935 | Dieterich ........................... 350/255 |
| 2,381,098 | 8/1945 | Bahu ................................ 350/255 |
| 2,503,789 | 4/1950 | Wood et al. ...................... 350/255 |
| 3,142,239 | 7/1964 | Meixner ........................... 350/255 |
| 3,220,308 | 11/1965 | Lareau ............................. 350/255 |

*Primary Examiner*—Paul A. Sacher
*Attorney, Agent, or Firm*—Harold V. Stotland; Roger M. Fitz-Gerald

[57] ABSTRACT

The photographic objective comprises a plurality of individual lens elements, only one or two of which being movable for focusing purposes. The other lens elements have fixed positions relative to each other and to the film plane. In a preferred embodiment, the objective comprises five lens elements, only the middle one of which is movable for focusing purposes.

9 Claims, 1 Drawing Figure

FILM PLANE

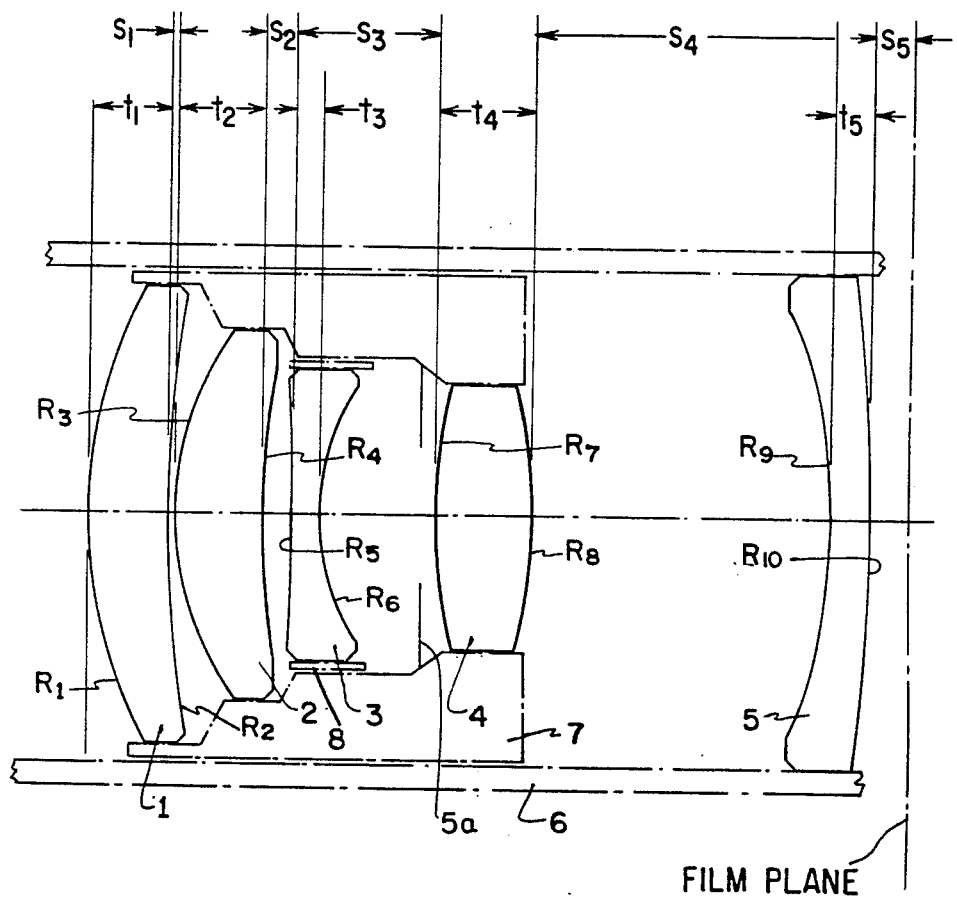

PHOTOGRAPHIC OBJECTIVE

BACKGROUND OF THE INVENTION

A photographic objective is a lens used in a camera to focus light emanating from an object onto the image or film plane. In the usual camera, the lens is movable along the lens axis toward and away from the film plane, to a position where the image of the object is focused at the fixed film plane. The iris diaphragm, which controls the quantity of light passing through the lens, is so arranged that the entire lens including the iris diaphragm, or at least most of the lens elements as a group, is movable to focus the image. However, in certain camera constructions, it is necessary to place the iris diaphragm at a position where movement of neither it nor the entire lens, or even most of the elements of the lens, is feasible.

SUMMARY OF THE INVENTION

It is therefore an important object of the present invention to provide a photographic objective in which one lens element or a pair of lens elements is movable along the lens axis for focusing purposes, and which has excellent performance over a considerable field at a relatively fast speed.

In summary there is provided a photographic objective for focusing light from an object onto a receiving medium, comprising mounting structure, a plurality of fixed lens elements fixedly attached in use to the mounting structure and arranged along a lens axis, and one movable lens element or a pair of movable lens elements movably carried by the mounting structure and movable in respect to the fixed lens elements along the lens axis for focusing light from the object onto the fixed receiving medium.

The invention consists of certain novel features and a combination of parts hereinafter fully described, illustrated in the accompanying drawing, and particularly pointed out in the appended claims, it being understood that various changes in the details of the photographic objective may be made without departing from the spirit, or sacrificing any of the advantages of the invention.

BRIEF DESCRIPTION OF THE DRAWING

For the purpose of facilitating an understanding of the invention, there is illustrated in the accompanying drawing a preferred embodiment thereof, from an inspection of which, when considered in connection with the following description, the invention, its construction and operation, and many of its advantages should readily be understood and appreciated.

The accompanying DRAWING shows in diagrammatical axial section a photographic objective according to the invention.

DESCRIPTION OF THE PREFERRED EMBODIMENTS

The photographic objective depicted has a nominally fixed focal length and includes positive meniscus elements 1 and 2, a biconcave element 3, a biconvex element 4, and a negative meniscus element 5. The element 5 could be plano-concave or biconcave. The iris diaphragm 5a is located between the lens elements 3 and 4. The lens elements 1 to 5 are positioned in mounting structure which is schematically illustrated in phantom and has three barrels or cylindrical portions 6, 7 and 8. The lens element 5 is fixedly attached to the portion 6, the elements 1, 2 and 4 are fixedly attached to the portion 7, and the element 3 is fixedly attached to the portion 8. The portion 7 is slidably carried by the portion 6, and the portion 8 is slidably carried by the portion 7. Thus, the lens elements 1, 2, 3 and 4 are movable as a unit, with respect to the lens element 5, by moving the portion 7. The position of the portion 7 with respect to the portion 6 is adjusted at the factory, such that the image of an object which may conveniently be selected to be about 12 feet away is focused at the film plane. The position of the portion 6 is then fixed.

The photographic objective described above is particularly advantageous in that it does not require movement of the iris diaphragm 5a. In certain cameras, the iris diaphragm and the shutter comprise a single unit, which unit becomes very difficult to move. In the embodiment depicted, that unit is fixed and the lens element 3 is movable with respect thereto.

The user of the camera in which the photographic objective depicted is mounted, moves the lens element 3 with respect to the other four lens elements 1, 2, 4 and 5, the positions of which had been fixed at the factory. Thus, as the lens is focused, the air spaces $s_2$ and $s_3$ vary, although their sum remains constant. When the object is at infinity, the air space $s_2$ is a minimum and the air space $s_3$ is a maximum. In a specific embodiment to be described, the photographic objective is capable of focusing an object which is 2.5 feet away. Then, the air space $s_2$ is at a maximum and the air space $s_3$ is at a minimum.

The following table sets forth the parameters of a photographic objective constituting a first example, of the present invention. The lens elements are designated by number in the first column, the corresponding refractive index N and the dispersion V are given in the second and third columns respectively, the radii of curvature, numbered front to rear in the fourth column, the thicknesses in the fifth column and the air spaces in the last column. The + and − values of the radii R denote surfaces respectively convex and concave. "E.F.L." is the effective focal length of the lens, and "One-half Angle of Field" is one-half the angle between the continuation of the lens axis and a line from the nodal point of the lens to the most oblique point recorded on the film.

Example 1

| Lens Element | N | V | Radii (inches) | Thicknesses (inches) | Air Spaces (inches) |
|---|---|---|---|---|---|
| (E.F.L. = 1.03 inches) | | | | | |
| (½ Angle of Field = 22.82°) | | | | | |
| 1 | 1.69 | 54.8 | $R_1 = +.7750$ | $t_1 = .137$ | |
|  |  |  | $R_2 = -2.2580$ |  | $s_1 = .005$ |
| 2 | 1.691 | 54.8 | $R_3 = +.5140$ | $t_2 = .155$ | |
|  |  |  | $R_4 = -1.2310$ |  |  |
| 3 | 1.755 | 27.6 | $R_5 = -7.5950$ | $t_3 = .047$ | $s_2+s_3 = .195$ |

Example 1-continued (E.F.L. = 1.03 inches)
(½ Angle of Field = 22.82°)

| Lens Element | N | V | Radii (inches) | Thicknesses (inches) | Air Spaces (inches) |
|---|---|---|---|---|---|
| 4 | 1.691 | 54.8 | $R_6 = -.3900$ | | |
| | | | $R_7 = +.9500$ | $t_4 = .151$ | |
| | | | $R_8 = +.8945$ | | $s_4 = .4930$ |
| 5 | 1.492 | 57.8 | $R_9 = -.88134$ | $t_5 = .060$ | |
| | | | $R_{10} = +3.0050$ | | $s_5 = .0589$ |

In Example 1, the surface represented by the radius $R_9$ is aspheric, the radius value given being the vertex radius of the surface. Actually, the surface form is defined by the following aspheric formula:

$$Z_1 = \frac{K(H^2 - Z_0^2) + 2(AH^4 + BH^6 + CH^8 + DH^{10})}{2(1 - KZ_0)}$$

In Example 1, $K = 1/R = -1.13464$, $A = -2.3806$, $B = 21.877$, $C = -80$ and $D = 0$.

In Example 1, the air spaces $S_2$ and $s_3$ have the values set forth in the following table in accordance with the distance to the object:

| Distance to object (feet) | Air Space $s_2$ (inches) | Air space $s_3$ (inches) |
|---|---|---|
| 2.5 | .0585 | .1365 |
| 3 | .0550 | .1400 |
| 4 | .0515 | .1435 |
| 5 | .0495 | .1455 |
| 6 | .0485 | .1465 |
| 7 | .0475 | .1475 |
| 10 | .0460 | .1490 |
| 12 | .0450 | .1500 |
| 20 | .0435 | .1515 |
| ∞ | .0415 | .1535 |

The following table gives data for a second example of a photographic objective incorporating the features of the present invention:

Example 2

(E.F.L. = 1.0347 inches)
(½ Angle of Field = 20.97°)

| Lens Element | N | V | Radii (inches) | Thicknesses (inches) | Air Spaces (inches) |
|---|---|---|---|---|---|
| 1 | 1.651 | 55.7 | $R_1 = +1.0800$ | $t_1 = .1220$ | |
| | | | $R_2 = -14.3139$ | | $s_1 = .005$ |
| 2 | 1.651 | 55.7 | $R_3 = +.4670$ | $t_2 = .1330$ | |
| | | | $R_4 = -1.1330$ | | |
| 3 | 1.755 | 27.5 | $R_5 = -27.5862$ | $t_3 = .0480$ | $s_2+s_3 = .2750$ |
| | | | $R_6 = -.3949$ | | |
| 4 | 1.691 | 54.7 | $R_7 = +1.0670$ | $t_4 = .1520$ | |
| | | | $R_8 = +.8830$ | | $s_4 = .4910$ |
| 5 | 1.492 | 57.7 | $R_9 = -.88134$ | $t_5 = .0600$ | |
| | | | $R_{10} = +3.0050$ | | $s_5 = .0532$ |

In Example 2, surface represented by the radius $R_9$ is aspheric, the surface form of which is determined by the previously noted formula, in which the constants K, A, B, C and D have the same values noted with respect to Example 1.

The following table is a third example of a photographic objective incorporating the features of the present invention:

Example 3

(E.F.L. = 1.0287 inches)
(½ Angle of Field = 22.82°)

| Lens Element | N | V | Radii (inches) | Thicknesses (inches) | Air Spaces (inches) |
|---|---|---|---|---|---|
| 1 | 1.670 | 47.1 | $R_1 = +1.0480$ | $t_1 = .1330$ | |
| | | | $R_2 = -7.9990$ | | $s_1 = .0050$ |
| 2 | 1.670 | 47.1 | $R_3 = +.5420$ | $t_2 = .1370$ | |
| | | | $R_4 = -2.0284$ | | |
| 3 | 1.805 | 25.4 | $R_5 = -3.1245$ | $t_3 = .0810$ | $s_2+s_3 = .2220$ |
| | | | $R_6 = -.4545$ | | |
| 4 | 1.670 | 47.1 | $R_7 = +.8900$ | $t_4 = .1530$ | |
| | | | $R_8 = +.8260$ | | $s_4 = .4930$ |
| 5 | 1.492 | 57.7 | $R_9 = -.30863$ | $t_5 = .0580$ | |
| | | | $R_{10} = +.6300$ | | $s_5 = .0585$ |

In Example 3, the surface represented by the radius $R_9$ is aspheric, in accordance with the formula previously set forth, with $K = -3.24012$, $A = 0.40816$, $B = 52.190$, $C = -267.71$, and $D = 0$.

The following table sets forth the parameters of a fourth example of a photographic objective incorporating the features of the present invention:

Example 4

| Lens Element | N | V | Radii (inches) | Thicknesses (inches) | Air Spaces (inches) |
|---|---|---|---|---|---|
| | | | (E.F.L. = 1.0429 inches) | | |
| | | | (½ Angle of Field = 20.98°) | | |
| 1 | 1.734 | 51.7 | $R_1 = +1.1860$ | $t_1 = .1148$ | |
| | | | $R_2 = -13.5159$ | | $s_1 = .005$ |
| 2 | 1.734 | 51.7 | $R_3 = +.4877$ | $t_2 = .1281$ | |
| | | | $R_4 = -1.0005$ | | |
| 3 | 1.805 | 25.4 | $R_5 = +9.8738$ | $t_3 = .0450$ | $s_2+s_3 = .2666$ |
| | | | $R_6 = -.4041$ | | |
| 4 | 1.734 | 51.7 | $R_7 = +1.3264$ | $t_4 = .2127$ | |
| | | | $R_8 = +.8830$ | | $s_4 = .4800$ |
| 5 | 1.492 | 57.8 | $R_9 = -2.76983$ | $t_5 = .0600$ | |
| | | | $R_{10} = \infty$ | | $s_5 = .0570$ |

In Example 4, the surface represented by the radius $R_9$ is aspheric in accordance with the formula previously set forth, with $K = -0.36103$, $A = -3.6168$, $B = 35.227$, $C = -85$ and $D = 0$. It should be noted that in Example 4, the radius $R_{10}$ is infinity rather than the concave surfaces shown in the drawing.

The following table sets forth a fifth example of a photographic objective having four lens elements rather than five as depicted in the drawing. Each of the first, second and third lens elements is a positive meniscus, and the fourth element is biconvex.

Example 5

| Lens Element | N | V | Radii (inches) | Thicknesses (inches) | Air Spaces (inches) |
|---|---|---|---|---|---|
| | | | (E.F.L. = 1.0333 inches) | | |
| | | | (½ Angle of Field = 22.81°) | | |
| 1 | 1.651 | 55.8 | $R_1 = +.5447$ | $t_1 = .1536$ | |
| | | | $R_2 = -8.1220$ | | $s_1 = .005$ |
| 2 | 1.651 | 55.8 | $R_3 = +.3945$ | $t_2 = .1174$ | |
| | | | $R_4 = -.5199$ | | |
| 3 | 1.805 | 25.4 | $R_5 = +8.5187$ | $t_3 = .0500$ | $s_2+s_3 = .2317$ |
| | | | $R_6 = -.3165$ | | |
| 4 | 1.691 | 54.8 | $R_7 = +.8512$ | $t_4 = .1517$ | |
| | | | $R_8 = +1.2285$ | | $s_4 = .4996$ |

It is believed that the invention, its construction and operation, and its advantages should be readily understood from the foregoing without further description, and it should also be manifest that, while preferred embodiments of the invention have been shown and described for illustrative purposes, the details as to the structure are, nevertheless, capable of wide variation within the purview of the invention, as defined in the appended claims.

What is claimed is:

1. A photographic objective for focusing light from an object onto a receiving medium, comprising mounting structure, and first, second, third, fourth, and fifth lens elements being fixedly attached in use to said mounting structure, said third lens element being movably carried by said mounting structure and being movable with respect thereto along said lens axis for focusing light from the object onto the receiving medium, constructed substantially in accordance with the following specifications:

| Lens Element | N | V | Radii | Thicknesses | Air Spaces |
|---|---|---|---|---|---|
| 1 | 1.69 | 54.8 | $R_1 = +.742F$ | $t_1 = .133F$ | |
| | | | $R_2 = -2.192F$ | | $s_1 = .005F$ |
| 2 | 1.691 | 54.8 | $R_3 = +.499F$ | $t_2 = .150F$ | |
| | | | $R_4 = -1.195F$ | | |
| 3 | 1.755 | 276 | $R_5 = -7.374F$ | $t_3 = .046F$ | $s_2+s_3 = .189F$ |
| | | | $R_6 = -.379F$ | | |

-continued

| Lens Element | N | V | Radii | Thicknesses | Air Spaces |
|---|---|---|---|---|---|
| 4 | 1.691 | 54.8 | $R_7 = +.922F$ | $t_4 = .147F$ | |
| | | | $R_8 = +.868F$ | | $s_4 = .479F$ |
| 5 | 1.492 | 57.8 | $R_9 = -.856F$ | $t_5 = .058F$ | |
| | | | $R_{10} = +.2917F$ | | $s_5 = .057F$ | in which the first column lists the lens elements from front to rear, the second column lists the refractive indices respectively for said lens elements, the third column lists the dispersion values respectively for said lens elements, the fourth column lists the radii of curvature $R_1$–$R_{10}$ of the surfaces of said lens elements numbered front to rear, the + and − values of the radii R denoting surfaces convex and concave to the front, and wherein the value for $R_9$ is the vertex radius of curvature for an aspheric surface, the fifth column lists the thicknesses $t_1$–$t_5$ respectively of said lens elements, the sixth column lists the air spaces $s_1$–$s_5$ between said lens elements numbered front to rear, and F is the effective focal length of said photographic objective.

2. The photographic objective set forth in claim 1, wherein the surface represented by the radius $R_9$ is aspheric in accordance with the following formula:

$$Z_1 = \frac{K(H^2 - Z_0^2) + 2(AH^4 + BH^6 + CH^8 + DH^{10})}{2(1 - KZ_0)}$$

in which $K = -1.13464$, $A = -2.3806$, $B = 21.877$, $C = -80$, and $D = 0$.

3. A photographic objective for focusing light from an object onto a receiving medium, comprising mounting structure, and first, second, third, fourth, and fifth lens elements being fixedly attached in use to said mounting structure, said third lens element being movably carried by said mounting structure and being movable with respect thereto along said lens axis for focusing light from the object onto the receiving medium, constructed substantially in accordance with the following specifications:

| Lens Element | N | V | Radii | | Thicknesses | Air Spaces |
|---|---|---|---|---|---|---|
| 1 | 1.651 | 55.7 | $R_1$ = +1.044F | | $t_1$ = .118F | |
| | | | $R_2$ = −13.834F | | | $s_1$ = .005F |
| 2 | 1.651 | 55.7 | $R_3$ = +.451F | | $t_2$ = .129F | |
| | | | $R_4$ = −1.095F | | | |
| 3 | 1.755 | 27.5 | $R_5$ = −26.661F | | $t_3$ = .046F | $s_2+s_3$ = .266F |
| | | | $R_6$ = −.382F | | | |
| 4 | 1.691 | 54.7 | $R_7$ = +1.031F | | $t_4$ = .147F | |
| | | | $R_8$ = +.853F | | | $s_4$ = .475F |
| 5 | 1.492 | 57.7 | $R_9$ = −.852F | | $t_5$ = .058F | |
| | | | $R_{10}$ = +2.904F | | | $s_5$ = .051F | in which the first column lists the lens elements from front to rear, the second column lists the refractive indices respectively for said lens elements, the third column lists the dispersion values respectively for said lens elements, the fourth column lists the radii of curvature $R_1$–$R_{10}$ of the surfaces of said lens elements numbered front to rear, the + and − values of the radii R denoting surfaces convex and concave to the front, and wherein the value for $R_9$ is the vertex radius of curvature for an aspheric surface, the fifth column lists the thicknesses $t_1$–$t_5$ respectively of said lens elements, the sixth column lists the air spaces $s_1$–$s_5$ between said lens elements numbered front to rear, and F is the effective focal length of said photographic objective.

4. The photographic objective set forth in claim 3, wherein $R_9$ is aspheric in accordance with the following formula:

$$Z_1 = \frac{K(H^2 - Z_0^2) + 2(AH^4 + BH^6 + CH^8 + DH^{10})}{2(1 - KZ_0)}$$

in which $K = -1.13464$, $A = -2.3806$, $B = 21.877$, $C = -80$, and $D = 0$.

5. A photographic objective for focusing light from an object onto a receiving medium, comprising mounting structure, and first, second, third, fourth, and fifth lens elements being fixedly attached in use to said mounting structure, said third lens element being movably carried by said mounting structure and being movable with respect thereto along said lens axis for focusing light from the object onto the receiving medium, constructed substantially in accordance with the following specifications:

| Lens Element | N | V | Radii | | Thicknesses | Air Spaces |
|---|---|---|---|---|---|---|
| 1 | 1.670 | 47.1 | $R_1$ = +1.019F | | $t_1$ = .129F | |
| | | | $R_2$ = −7.776F | | | $s_1$ = .005F |
| 2 | 1.670 | 47.1 | $R_3$ = +.527F | | $t_2$ = .133F | |
| | | | $R_4$ = −1.972F | | | |
| 3 | 1.805 | 25.4 | $R_5$ = −3.037F | | $t_3$ = .079F | $s_2+s_3$ = .216F |
| | | | $R_6$ = −.442F | | | |
| 4 | 1.670 | 47.1 | $R_7$ = +.865F | | $t_4$ = .149F | |
| | | | $R_8$ = +.803F | | | $s_4$ = .479F |
| 5 | 1.492 | 57.7 | $R_9$ = −.300F | | $t_5$ = .056F | |
| | | | $R_{10}$ = +.612F | | | $s_5$ = .057F | in which the first column lists the lens elements from front to rear, the second column lists the refractive indices respectively for said lens elements, the third column lists the dispersion values respectively for said lens elements, the fourth column lists the radii of curvature $R_1$–$R_{10}$ of the surfaces of said lens elements numbered front to rear, the + and − values of the radii R denoting surfaces convex and concave to the front, and wherein the value for $R_9$ is the vertex radius of curvature for an aspheric surface, the fifth column lists the thicknesses $t_1$–$t_5$ respectively of said lens elements, the sixth column lists the air spaces $s_1$–$s_5$ between said lens elements numbered front to rear, and F is the effective focal length of said photographic objective.

6. The photographic objective set forth in claim 5, wherein the surface represented by the radius $R_9$ is aspheric in accordance with the following formula:

$$Z_1 = \frac{K(H^2 - Z_0^2) + 2(AH^4 + BH^6 + CH^8 + DH^{10})}{2(1 - KZ_0)}$$

in which $K = -3.24012$, $A = 0.40816$, $B = 52.190$, $C = -267.71$, and $D = 0$.

7. A photographic objective for focusing light from an object onto a receiving medium, comprising mounting structure, and first, second, third, fourth, and fifth lens elements being fixedly attached in use to said mounting structure, said third lens element being movably carried by said mounting structure and being movable with respect thereto along said lens axis for focusing light from the object onto the receiving medium, constructed substantially in accordance with the following specifications:

| Lens Element | N | V | Radii | | Thicknesses | Air Spaces |
|---|---|---|---|---|---|---|
| 1 | 1.734 | 51.7 | $R_1$ = +1.137F | | $t_1$ = .110F | |
| | | | $R_2$ = −12.960F | | | $s_1$ = .005F |
| 2 | 1.734 | 51.7 | $R_3$ = +.468F | | $t_2$ = .123F | |
| | | | $R_4$ = −.959F | | | |
| 3 | 1.805 | 25.4 | $R_5$ = +9.468F | | $t_3$ = .043F | $s_2+s_3$ = .256F |
| | | | $R_6$ = −.039F | | | |
| 4 | 1.734 | 51.7 | $R_7$ = 1.272F | | $t_4$ = .204F | |
| | | | $R_8$ = +.847F | | | $s_4$ = .460F |
| 5 | 1.492 | 57.8 | $R_9$ = −2.656F | | $t_5$ = .058F | |
| | | | $R_{10}$ = ∞ | | | $s_5$ = .055F | in which the first column lists the lens elements from front to rear, the second column lists the refractive indices respectively for said lens elements, the third column lists the dispersion values respectively for said lens elements, the fourth column lists the radii of curvature $R_1$–$R_{10}$ of the surfaces of said lens elements numbered front to rear, the + and − values of the radii R denoting surfaces convex and concave to the front, and wherein the value for $R_9$ is the vertex radius of curvature for an aspheric surface, the fifth column lists the thicknesses $t_1$–$t_5$ respectively of said lens elements, the sixth column lists the air spaces $s_1$–$s_5$ between said lens elements numbered front to rear, and F is the effective focal length of said photographic objective.

8. The photographic objective set forth in claim 7, wherein the surface represented by the radius $R_9$ is aspheric in accordance with the following formula:

$$Z_1 = \frac{K(H^2 - Z_0^2) + 2(AH^4 + BH^6 + CH^8 + DH^{10})}{2(1 - KZ_0)}$$

in which $K = -0.36103$, $A = -3.6168$, $B = 35.227$, $C = -85$, and $D = 0$.

9. A photographic objective for focusing light from an object onto a receiving medium, comprising mounting structure, and first, second, third, and fourth lens lens elements arranged on a lens axis, said first, second, and fourth lens elements being fixedly attached in use to said mounting structure, said third lens element being movably carried by said mounting structure and being movable with respect thereto along said lens axis for focusing light from the object onto the receiving medium, constructed substantially in accordance with the following specifications:

| Lens Element | N | V | Radii | Thicknesses | Air Spaces |
|---|---|---|---|---|---|
| 1 | 1.651 | 55.8 | $R_1 = +.527F$<br>$R_2 = -7.860F$ | $t_1 = .149F$ | $s_1 = .005F$ |
| 2 | 1.651 | 55.8 | $R_3 = +.382F$<br>$R_4 = -.503F$ | $t_2 = .114F$ | |
| 3 | 1.805 | 25.4 | $R_5 = +8.244F$ | $t_3 = .048F$ | $s_2+s_3 = .224F$ |
| 4 | 1.691 | 54.8 | $R_6 = -.306F$<br>$R_7 = +.824F$<br>$R_8 = +1.189F$ | $t_4 = .147F$ | $s_4 = .483F$ | in which the first column lists the lens elements from front to rear, the second column lists the refractive indices respectively for said lens elements, the third column lists the dispersion values respectively for said lens elements, the fourth column lists the radii of curvature $R_1$–$R_8$ of the surfaces of said lens elements numbered front to rear, the + and − values of the radii R denoting surfaces convex and concave to the front, the fifth column lists the thicknesses $t_1$–$t_4$ respectively of said lens elements, the sixth column lists the air spaces $s_1$–$s_4$ between said lens elements numbered front to rear, and F is the effective focal length of said photographic objective.

* * * * *